(No Model.)

H. BARNEY & H. RAHN.
FIFTH WHEEL FOR VEHICLES.

No. 439,621. Patented Nov. 4, 1890.

Witnesses:
Harry T. Jones.
Frank S. Blanchard

Inventors:
Henry Barney
Henry Rahn.
By West & Bond
Attys.

UNITED STATES PATENT OFFICE.

HENRY BARNEY AND HENRY RAHN, OF HILLSBOROUGH, WISCONSIN, ASSIGNORS TO THE ROLLER-BEARING AXLE COMPANY, OF SAME PLACE.

FIFTH-WHEEL FOR VEHICLES.

SPECIFICATION forming part of Letters Patent No. 439,621, dated November 4, 1890.

Application filed March 21, 1890. Serial No. 344,798. (No model.)

*To all whom it may concern:*

Be it known that we, HENRY BARNEY and HENRY RAHN, residing at Hillsborough, Vernon county, State of Wisconsin, and citizens of the United States, have invented a certain new and useful Improvement in Fifth-Wheels or Rocker-Plates for Wagons, of which the following is a specification, reference being had to the accompanying drawings, in which—

Figure 1:
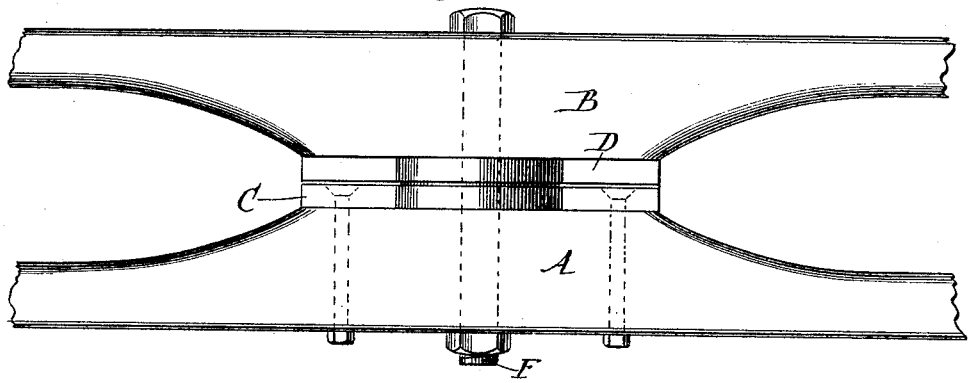
Figure 2:
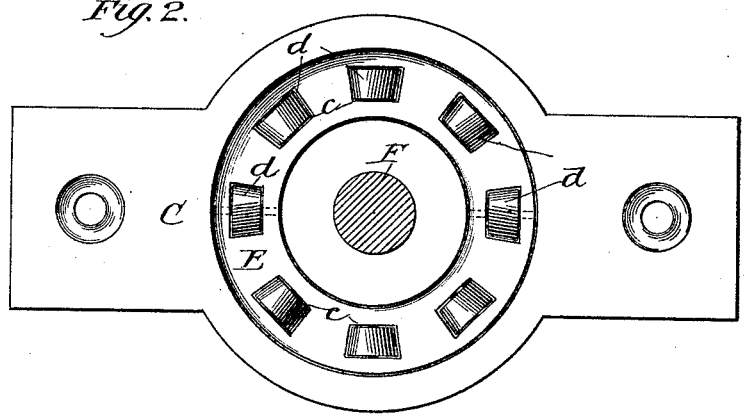
Figure 3:
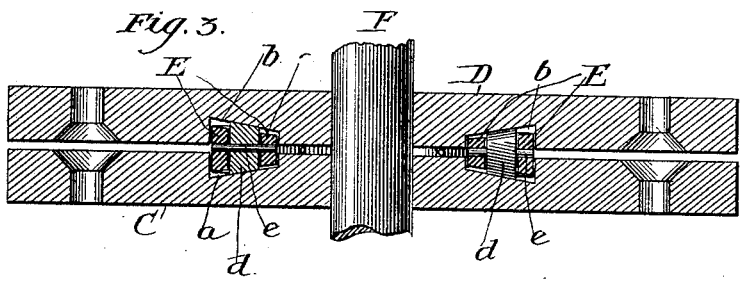

Figure 1 is a front elevation. Fig. 2 is a plan of one of the main plates with the ring and rollers therein. Fig. 3 is a central longitudinal vertical section through the whole device. Figs. 2 and 3 are considerably enlarged, as compared with Fig. 1, and are about half the size of such a device adapted for use with an ordinary wagon.

Our invention is primarily designed to be used in the place of fifth-wheels for wagons, but may be used in place of the circles used with sleighs, or as a turn-table bearing, or as a step for upright shafting, or for other similar purposes.

In the drawings, A represents the axle of a wagon.

B is the bolster.

C is a plate made of metal provided with an annular recess $a$, the bottom of which is inclined from the outside upward on lines which, if continued, would cross the center of the plate.

D is another plate similar to the plate C, and it is provided with an annular recess $b$, inclined, as shown in the drawings. These two plates C D are, in fact, duplicates of each other.

E is an annular ring, the upper and lower surfaces of which are, as shown, inclined to correspond with the inclined recesses in the plates C D. This ring is provided with a number of holes $c$, which extend through it.

$d$ are rollers, which taper toward the center of the ring, the angles or lines of the taper corresponding with the inclined recesses $a$ $b$ in the plates C D. The rollers are located one in each of the holes $c$, and each is supported on a pin $e$, the ends of which are supported in the ring E.

The plates C D are secured, respectively, to the axle and bolster by bolts or screws.

F is in the drawings a king-bolt.

In use the plates C D, one, or both, as the case may be, can rotate, and the ring E can also rotate in the recesses in the plates, the rollers $d$ bearing against the bottoms of the recesses in the plates. There is no pressure upon the axles or pins $e$ of these rollers. The inner and outer walls of the annular ring E are perpendicular, as are the walls of the recesses $a$ and $b$, and the annular ring E extends into both recesses, so that this ring E takes off all strain from the king-bolt in ordinary use. We thus provide a device the movement of the several parts of which is attended with very little friction and which is well adapted to be used for various purposes, as previously stated.

What we claim as new, and desire to secure by Letters Patent, is as follows:

A plate C, provided with an annular recess $a$, and a plate D, provided with an annular recess $b$, in combination with a ring E, having a number of holes $c$ and rollers $d$, pivotally supported in such holes, substantially as and for the purposes specified.

HENRY BARNEY.
HENRY RAHN.

Witnesses:
L. B. T. WINSLOW,
C. F. FINE.